United States Patent

Rhein et al.

[11] Patent Number: 5,612,417
[45] Date of Patent: Mar. 18, 1997

[54] THERMOPLASTIC MOLDING MATERIALS HAVING HIGH TRANSPARENCY PREPARED FROM COMPATIBLE POLYMER ALLOYS

[75] Inventors: Thomas Rhein, Stadecken-Elsheim; Michael Wicker, Seeheim-Jugenheim; Mona Rueppel, Hoechst/Odenwald; Gerald Dietrich, Darmstadt; Ernst Mohr, Lorsch, all of Germany

[73] Assignee: Roehm GmbH Chemische Fabrik, Darmstadt, Germany

[21] Appl. No.: 568,487

[22] Filed: Dec. 7, 1995

[30] Foreign Application Priority Data

Dec. 7, 1994 [DE] Germany .................. 44 43 557.6

[51] Int. Cl.$^6$ .................. C08L 25/14; C08L 33/02; C08L 33/10
[52] U.S. Cl. .................. 525/221; 525/222; 525/228; 525/229
[58] Field of Search .................. 525/221, 228, 525/229, 301, 226

[56] References Cited

U.S. PATENT DOCUMENTS

| | | | |
|---|---|---|---|
| 2,887,464 | 5/1959 | Coover et al. | 525/228 |
| 3,957,921 | 5/1976 | Iwahashi et al. | 525/228 |
| 4,508,871 | 4/1985 | Keskkula et al. | 525/78 |
| 5,066,718 | 11/1991 | Jiol et al. | 525/84 |
| 5,109,072 | 4/1992 | Jiol et al. | 525/228 |

FOREIGN PATENT DOCUMENTS 2063887 6/1981 United Kingdom .................. 525/228

*Primary Examiner*—Mark Warzel
*Attorney, Agent, or Firm*—Oblon, Spivak, McClelland, Maier & Neustadt, P.C.

[57] ABSTRACT

A thermoplastic polymethacrylate molding material with a high degree of thermal dimensional stability, a high degree of transparency, a high degree of flowability and a high degree of resistance against water, monomeric methylmethacrylate, mixtures consisting of ethanol and water, as well as fuel, wherein the molding material is a compatible mixture of 1 to 99 wt % of a copolymer P, made from (p1) 30 to 70 wt % styrene and/or α-methylstyrene, (p2) 29 to 70 wt % ($C_1$–$C_6$-alkyl)methacrylate, and (p3) 1 to 20 wt % acrylic acid and/or methacrylic acid, the sum of (p1), (p2), and (p3) adding up to 100 wt %, and 99 to 1 wt.-parts of a polymethylmethacrylate polymer PM, made of (pm1) 80 to 100 wt % methylmethacrylate, as well as (pm2) 0 to 20 wt % monomers which can be copolymerized with methylmethacrylate.

8 Claims, No Drawings

THERMOPLASTIC MOLDING MATERIALS HAVING HIGH TRANSPARENCY PREPARED FROM COMPATIBLE POLYMER ALLOYS

BACKGROUND OF THE INVENTION

1. Field of the Invention

The present invention relates to thermoplastic molding materials having dimensional stability under heat and stress cracking resistance and exhibiting a high degree of transparency.

2. Discussion of the Background

DE-A 12 31 013 describes a method for producing copolymers which are composed of 1 to 50 wt % of an α-alkylstyrene and 99 to 50 wt % of an alkylmethacrylate, optionally containing secondary amounts of other polymerizable compounds, wherein the copolymers contain 0.1 to 20 wt % maleic anhydride and/or methacrylic acid. Molding materials made from these copolymers display little tendency to form cracks when they are alternately exposed to hot and cold water.

DE-A 23 41 123 discloses thermoplastic molding materials which are composed of 50 to 99 wt % styrene or ($C_1$–$C_8$-alkyl)methacrylate, as well as 1 to 50 wt % of an α-substituted acrylic acid, such as methacrylic acid, wherein at least 5 wt % of the acid must be present in the form of acid anhydride. The transfer of a part of the carboxyl groups into anhydride groups is accomplished with the help of a thermal treatment of the molding material at a temperature above the Vicat softening point.

JP-A 83 125 712 describes molding materials which are composed of copolymers from 50–98 wt % methylmethacrylate, 1 to 25 wt % styrene, and 1 to 25 wt % methacrylic acid with a high degree of thermal dimensional stability and a high degree of stability against thermal decomposition.

EP-A 273 397 describes substrates for optical elements which are composed of copolymers from methylmethacrylate, aromatic vinyl compounds, an unsaturated carboxylic acid, and glutaric acid anhydride units, which have good thermal dimensional stability and a high degree of transparency.

U.S. Pat. No. 2,851,448 discloses transparent ter-polymers which are produced by chamber polymerization of monomer mixtures of vinyl aromatic compounds, alkylmethacrylates, and unsaturated carboxylic acids, such as acrylic or methacrylic acid, in specified compositions.

EP-A 264 508 describes a process for the production of copolymers having high degrees of thermal dimensional stability which comprises a secondary thermal treatment of the copolymers made from vinyl monomers, such as styrene and methylmethacrylate, and from acrylic or methacrylic acid units. During the secondary thermal treatment, (meth-)acrylic acid units turn into cyclic anhydride units in the polymer chain.

The copolymers described in the state of the art which contain alkylmethacrylates, vinyl aromatic compounds and unsaturated carboxylic acids are high-grade molding materials with regard to their thermal dimensional stability under heat and their corrosion resistance against different solvents. This is why experts are interested in mixing such copolymers with conventional molding materials in order to improve the properties of such molding materials. If one considers the polymethylmethacrylate molding materials as mixing partners, then the requirement for the technical application of such mixtures is to maintain the high degree of transparency of the polymethylmethacrylate molding material. This means that such mixtures must be compatible with regard to thermodynamic aspects.

As a general rule, polymer mixtures are incompatible. Despite a growing number of specific examples which demonstrate the opposite and which have been found in the past few years, the expert's experience to date is still determined by the following phrase: "Miscibility is the exception, immiscibility is the rule" (ref. Kirk-Othmer, Encyclopedia of Chemical Technology, 3rd. ed., vol. 18, p. 460, J. Wiley, 1982).

SUMMARY OF THE PRESENT INVENTION

Accordingly, one object of the present invention is to provide a thermoplastic molding material having components which are compatible with one another and has a high degree of thermal dimensional stability.

A further object of the present invention is to provide a thermoplastic molding material having a high degree of transparency.

A further object of the present invention is to provide a thermoplastic molding material having each of the above advantages and a high degree of resistance to a wide range of chemicals, especially those chemicals used in the automotive field.

These and other objects of the present invention have been satisfied by the discovery of copolymers P, comprising monomer units derived from:

(p1): from 30 to 70 wt % of styrene, α-methylstyrene or a mixture thereof;

(p2): from 29 to 70 wt % of ($C_1$–$C_6$-alkyl)methacrylate; and (p3): from 1 to 20 wt % of acrylic acid, methacrylic acid, or a mixture thereof;

wherein the sum of (p1), (p2) and (p3) totals 100 wt % of the copolymer P; and 99 to 1 wt % of a polymethylmethacrylate polymer PM, comprising monomer units derived from (pm1): from 80 to 100 wt % of methylmethacrylate, and (pm2): from 0 to 20 wt % of monomers copolymerizable with methylmethacrylate, wherein P and PM are completely compatible in any weight ratio to form transparent thermoplastic molding materials.

DETAILED DESCRIPTION OF THE PREFERRED EMBODIMENTS

The present invention relates to a thermoplastic molding material having a high degree of transparency comprising a compatible mixture of 1 to 99 wt % of a copolymer P comprising monomer units derived from:

(p1): from 30 to 70 wt % of styrene, α-methylstyrene or a mixture thereof;

(p2): from 29 to 70 wt % of ($C_1$–$C_6$-alkyl)methacrylate; and (p3): from 1 to 20 wt % of acrylic acid, methacrylic acid, or a mixture thereof;

wherein the sum of (p1), (p2) and (p3) totals 100 wt % of copolymer P; and 99 to 1 wt % of a polymethylmethacrylate polymer PM, comprising monomer units derived from:

(pm1): from 80 to 100 wt % of methylmethacrylate, and (pm2): from 0 to 20 wt % of monomers copolymerizable with methylmethacrylate.

The thermal dimensional stabilities of the molding materials of the present invention, measured as Vicat softening temperatures, VET, in accordance with DIN [German Industry Standard] 53 460, generally exceed 100° C., preferably exceed 110° C. The molding materials are highly transparent and have a glass transition temperature $T_g$ which is determined by the proportion of ingredients of copolymers P and PM. In general the weight average molecular weights Mw of copolymers P and PM each range between $10^4$ and $5\times10^5$, preferably between $3\times10^4$ and $2.5\times10^5$ dalton. (Unless otherwise indicated, all molecular weights are reported as weight average molecular weights, Mw). Molecular weights can be determined by the procedure of H. F. Mark et al., Encyclopedia of Polymer Science and Technology, vol. 10, pp. 1 through 19, J. Wiley, New York, 1978.

The molding materials are equally well resistant in the environmental stress cracking test against monomeric methylmethacrylate, against gasoline, against ethanol-water-mixtures, as well as against hot water alternated with hot air (alternate hot water test).

Copolymers P are composed of monomer units (p1), (p2) and (p3). Examples of monomers (p2) include methyl methacrylate, ethylmethacrylate, propylmethacrylate, isopropylmethacrylate, butylmethacrylate, isobutylmethacrylate, pentylmethacrylate, hexylmethacrylate, cyclohexylmethacrylate, with methylmethacrylate being most preferred.

Copolymer P can be produced by conventional methods used in the polymerization of α,β-unsaturated monomer compositions, preferably by free radical polymerization. The polymerization can be performed in solution or as a suspension polymerization. Suitable radical polymerization initiators include azo compositions, such as azodiisobutyronitrile, peroxides, such as dibenzoyl peroxide or dilauroyl peroxide, or oxidation-reduction (redox) systems, or the initial radicals can be produced photochemically (ref., for example, H. Rauch-Puntigam, Th. Völker, "*Acryl- und Methacrylverbindungen,*" Springer-Verlag, Heidelberg, 1967 or Kirk-Othmer, Encyclopedia of Chemical Technology, vol. 1, pp. 386ff, J. Wiley, New York, 1978).

The copolymers P contain 30 to 70 wt %, preferably 30 to 55 wt %, most preferably 30 to 50 wt % of monomer units (p1), 29 to 70 wt %, preferably 40 to 65 wt %, most preferably 45 to 60 wt % of monomer units (p2), and 1 to 20 wt %, preferably 2 to 15 wt %, most preferably 3 to 10 wt % of monomer units of (p3), wherein the sum of the amounts of (p1), (p2) and (p3) adds up to 100 wt %. The weight average molecular weights $M_w$, of copolymers P preferably range from $10^4$ to $5\times10^5$ dalton, most preferably from $3\times10^4$ to $2.5\times10^5$ dalton, and have reduced viscosities $\eta_{spec.}/C$ (determined in accordance with DIN 51 562 in chloroform), from 10 to 150 $cm^3 g^{-1}$, preferably from 15 to 100 $cm^3 g^{-1}$. The molecular weights are controlled and adjusted by polymerizing the monomers in the presence of conventional molecular weight controllers, such as mercaptans (ref., for example, Houben-Weyl, *Methoden der organischen Chemie,* vol. XIV/1, page 66, 1961, or Kirk-Othmer, Encyclopedia of Chemical Technology, vol. 1, pp. 296ff, J. Wiley, New York, 1978).

The copolymers P can be processed thermoplastically into transparent, clear molding objects which have Vicat softening temperatures VET, in accordance with DIN 53 460, of from approximately 100° to 150°.

Polymers PM can be prepared in accordance with the same methods used to prepare copolymers P and have the same mean molecular weight properties. Suitable comonomers (pm2) of copolymers PM include methylacrylate, ethylacrylate, propylacrylate, butylacrylate, hexylacrylate, octylacrylate, styrene, α-methylstyrene, p-methylstyrene, vinyl acetate, vinyl propionate, with styrene and methylacrylate being preferred, and methylacrylate being most preferred.

As with copolymers P, polymers PM can be processed thermoplastically into transparent molding objects which have Vicat softening temperatures VET which range from approximately 100° to 130° C.

The molding materials of the present invention can be produced by mixing copolymers P and polymers PM, wherein any type of process capable of intimate mixing of P and PM can be employed.

Preferably, components P and PM are mechanically mixed, whereby the raw materials P and PM are preferably in the form of solids, such as granulates or pearl polymers, and whereby slow mixing devices, such as a drum mixer, a Rhönrad mixer, a twin-chamber mixer or a blade mixer are used. The slow mixing devices cause a mechanical mixing process without eliminating the phase limits (ref., for example, *Ullmanns Enzyklopädie der Technischen Chemie,* 4th ed, vol. 2, pp. 282–311, Verlag Chemie, Weinheim, New York, 1980). Thermoplastic processing is then carried out by mixing the components homogeneously in melted mass while using heated mixing devices at suitable temperatures, such as 150° to 300° C., in kneaders or, preferably in extruders, such as single screw extruders, multiple screw extruders or, if necessary, in extruders with oscillating screws and shearing pins (e.g. in a Bussco-Kneader).

In another embodiment for producing the present molding materials, polymer PM can be dissolved in a monomer mixture of (p1), (p2) and (p3), whereby the copolymer P is produced by polymerization in the presence of PM.

Characterization of the polymer mixtures of the present invention as compatible mixtures is carried out in accordance with conventional criteria (ref. Kirk-Othmer, loc.cit., vol. 18, pp. 457 through 460; Brandrup, Immergut, Polymer Handbook, 2nd ed., paragraph III, p. 211, Wiley Interscience, New York 1975).

The molding materials of the present invention exhibit an index of refraction and show only a single glass transition temperature, Tg, which ranges between the glass transition temperatures of mixing components P and PM. Another indicator used to determine the compatibility of the present molding materials is the occurrence of a LCST (Lower Critical Solution Temperature). The existence of an LCST is determined by a process wherein, during heating, the initially transparent mixture opens up into different phases and becomes optically cloudy due to the different indices of refraction of the individual components P and PM. This method provides solid proof that the original polymer mixture was composed of one single homogenous phase which was thermodynamically balanced (ref., for example, D. R. Paul, Polymer Blends & Mixtures, pp. 1 through 3, Martinus Nijhoff Publishers, Dordrecht, Boston, (1985).

The cloud point $T_{Tr}$ (cloud temperature) can be determined using a Kofler heat bench (ref. *Chem. Ing. Technik,* 1950, pp. 289ff).

Based alone on the fact that they are compatible, the molding materials in accordance with the present invention are of high technical interest. The present molding materials are typically clear and highly transparent. The thermal dimensional stability of polymers PM generally is increased by adding copolymers P with the help of an alloying process. Another important advantage, especially for the use in the automotive sector, is the fact that the present molding materials have a high degree of resistance against stress corrosion cracking in the following media:

monomeric methylmethacrylate, which, for example, is released from polymers PM when joining interior and exterior parts of rear car lights during the so-called buttwelding process with heat reflectors, ethanol/water mixtures as they are used in anti-freeze agents in cleaning fluids for car windows, and fuel for internal combustion engines, such as lead-free gasoline with a high octane rating.

The above media display a large range with regard to their polarity. Even more surprising than the above was the discovery that the molding materials of the present invention retain their excellent dimensional stability against fuels to a large degree, while the stabilities of the present molding materials against monomeric methylmethacrylate, as well as against ethanol/water mixtures, in general are clearly higher than those of polymer PM.

On the other hand, copolymers P, which have high amounts of monomers (p1), display a lower degree of dimensional stability against Otto-fuels which, in general, is considerably increased by adding polymer PM in an alloying process.

The molding materials of the present invention thus exhibit numerous synergistic combinations of the individual properties of mixing components P and PM. Another advantage is the fact that building components made from the present molding materials can be recycled which, after granulation, can be processed into transparent, heat-resistant molding materials together with granulated components of polymers PM, which in turn can be used as molding materials, which can be injection-molded. Another advantage is the characteristic of the molding materials of the present invention in the so-called alternate hot water test which simulates the stress on materials, for example in sanitary applications, by alternating between water and air exposure. This makes the molding materials suitable for household applications as well.

Having generally described this invention, a further understanding can be obtained by reference to certain specific examples which are provided herein for purposes of illustration only and are not intended to be limiting unless otherwise specified.

EXAMPLES

In the following examples, the tests described below were used to determine the various properties of the samples produced:

1. LCST was determined by measuring the cloud point $T_{Tr}$ on the Kofler heat bench (ref. above).

2. Vicat softening temperature VET in degrees Celsius was measured in accordance with DIN 53460.

3. Reduced viscosity $\eta_{spec.}/C$ in chloroform was measured in accordance with DIN 51562.

4. Viscosity of the polymer liquefied material, $\eta_s$, was measured in accordance with DIN 54811.

5. Glass transition temperature, Tg, was measured by differential scanning calorimetry (DSC, ref. above).

6. Mean molecular weight $M_w$ was measured by gel permeation chromatography (ref. above).

7. Stress cracking resistance was determined as follows:

Extruded slabs were made from the molding materials from which samples having the dimensions 230×20×4 mm were taken. The surface of the samples was cleaned with surfactant-containing water and the samples stored for 4 days at 23° C. and 50% rel. humidity before the testing process began.

20 MPa bending stress were applied to the cleaned samples at 23° C. Then test media, such as monomers or fuels, were sprayed over the entire surface of the samples and the timed t, until the samples break was determined.

8. Alternate hot water test:

Samples of dimensions 230×20×4 mm were made from the molding materials by injection molding. Before the tests, the samples were stored for at least one week at 23° C. and 50% rel. humidity.

One alternate cycle consisted of:

1. Dipping the samples into VE water with a starting temperature of 65° C. and storing the sample for 8 hours in the VE water, which cooled down to room temperature during this time.

2. Drying the sample over a period of 16 hours in the warming cupboard at 50° C.

The number of alternate cycles which occur before the first appearance of cracks was determined, with the cracks being determined visually and which run vertical to the injection molding direction.

Example 1

Production of Copolymer P1

20 g dilauroyl peroxide and 5 g 2,2-bis(tert.butylperoxy)butane were added as polymerization initiators to a monomer mixture composed of 5500 g methylmethacrylate, 3500 g styrene, and 1000 g methacrylic acid; with 27 g tertdodecylmercaptan added as a molecular weight controller. Oxygen was first removed from the solution in a polymerization chamber over dry ice by applying a vacuum over a period of 15 minutes. Polymerization was then carried out in a water bath for a period of 2.5 hours at 60° C. and for a period of 36 hours at 50° C. Final polymerization occurred when the chamber was then moderated in a drying chamber at 120° C. for 12 hours. Polymer P1 had the following properties:

$\eta_{spec.}/C = 72$ cm$^3$g$^{-1}$ $M_w$ in accordance with Mark-Houwink from $\eta_{spec.}/C$ with PMMA as standard gauge:

165,000 dalton

VET: 120° C.

Tg: 121° C.

alternate hot water test: 96 alternate cycles

Stress cracking resistance (until the sample breaks):

a) against methylmethacrylate: 799 s b) against ethanol/water: 75/25:278 s c) against lead-free premium grade gasoline: 158 s Examples 2 through 6

Production of mixtures from copolymer P1 and acrylic-molding material 8N (copolymer from 99 wt % methylmethacrylate and 1 wt % methylacrylate, $M_w \approx 110,000$ dalton).

Mixtures from copolymer P1 and acrylic-molding material 8N were produced with the help of a mechanical mixing process in which granulates of the individual components were mixed and subsequently melted and mixed in a laboratory single screw extruder. The tape extrudate was used as a sample for visually evaluating the compatibility, as well as determining the segregation temperatures ($T_{Tr}$) and the thermal dimension stability (Tg, VET).

| Example | Proportion of ingredients P1/8N | Visual evaluation of compatibility | $T_{Tr}$ [°C.] | Tg [°C.] | VET [°C.] | Melt viscosity η (220° C./5N) [Pa s] |
|---|---|---|---|---|---|---|
| 2 | 80/20 | transparent | >260 | 115 | 116.1 | 2.596 |
| 3 | 60/40 | transparent | >260 | 114 | 114.2 | 2.596 |
| 4 | 40/60 | transparent | >260 | 115 | 112.4 | 2.853 |
| 5 | 20/80 | transparent | >260 | 110 | 111.1 | 2.720 |
| 6 | 0/100 (reference) | transparent | — | — | 108 | 2.460 |

Examples 7 through 10

Characterization of mixtures of copolymer P1 and acrylic-molding material 8N with regard to stress cracking resistance and alternate hot water test.

| Example | Proportion of ingredients | Visual evaluation of compatibility | Alternate cycle in the alternate hot water test | Stress cracking resistance (time until the sample break) [s] against | | |
|---|---|---|---|---|---|---|
| | | | | methyl-methacrylate | ethanol/ water = 75/25 | lead-free premium grade gasoline |
| 7 | 90/10 | transparent | 11* | 430 | 159 | 430 |
| 8 | 75/25 | transparent | 18 | 89 | 60 | 215 |
| 9 | 50/50 | transparent | 11 | 48 | 15 | 78 |
| 10 | 0/100 (reference) | transparent | 5 | 3 | 8 | 52 |

*few small cracks, no new cracks

This application is based on German Patent Application P 44 43 557.6, filed with the German Patent Office on Dec. 7, 1994.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic molding material having a high degree of transparency, comprising a compatible mixture of 1 to 99 wt % of a copolymer P consisting of copolymerized monomer units:

(p1): from 30 to 70 wt % of styrene, α-methylstyrene or a mixture thereof;

(p2): from 29 to 70 wt % of ($C_1$–$C_6$-alkyl)methacrylate; and (p3): from 1 to 20 wt % of acrylic acid, methacylic acid, or a mixture thereof;

wherein the sum of (p1), (p2) and (p3) totals 100 wt % of copolymer P; and 99 to 1 wt % of a polymethylmethacrylate polymer PM, comprising monomer units derived from:

(pm1): from 80 to 100 wt % of methylmethacrylate, and (pm2): from 0 to 20 wt % of monomers copolymerizable with methylmethacrylate.

2. The thermoplastic molding material in accordance with claim 1, wherein copolymer P comprises from 30 to 55 wt % of (p1), from 40 to 65 wt % of (p2), and from 2 to 15 wt % of (p3).

3. The thermoplastic molding material in accordance with claim 1, wherein comonomer (pm2) in polymer PM is selected from the group consisting of ($C_1$–$C_8$-alkyl)acrylates, vinyl esters, vinyl aromatic compounds, acrylonitrile, methacrylonitrile and mixtures thereof.

4. The thermoplastic molding material in accordance with claim 1, wherein comonomer (p2) in copolymer P is methylmethacrylate.

5. The thermoplastic molding material in accordance with claim 1, wherein comonomer (pm2) in polymer PM is methylacrylate.

6. The thermoplastic molding material in accordance with claim 1, wherein copolymer P and polymer PM each independently have a weight average molecular weight $M_w$ from $10^4$ to $5 \times 10^5$ dalton.

7. The thermoplastic molding material in accordance with claim 1, wherein copolymer P is present in an amount of from 5 to 95 wt % and copolymer PM is present in an amount of from 95 to 5 wt %.

8. A molded object prepared by molding a thermoplastic molding material as claimed in claim 1.

* * * * *